F. R. WILLSON, Jr.
CONVEYER.
APPLICATION FILED OCT. 4, 1906.

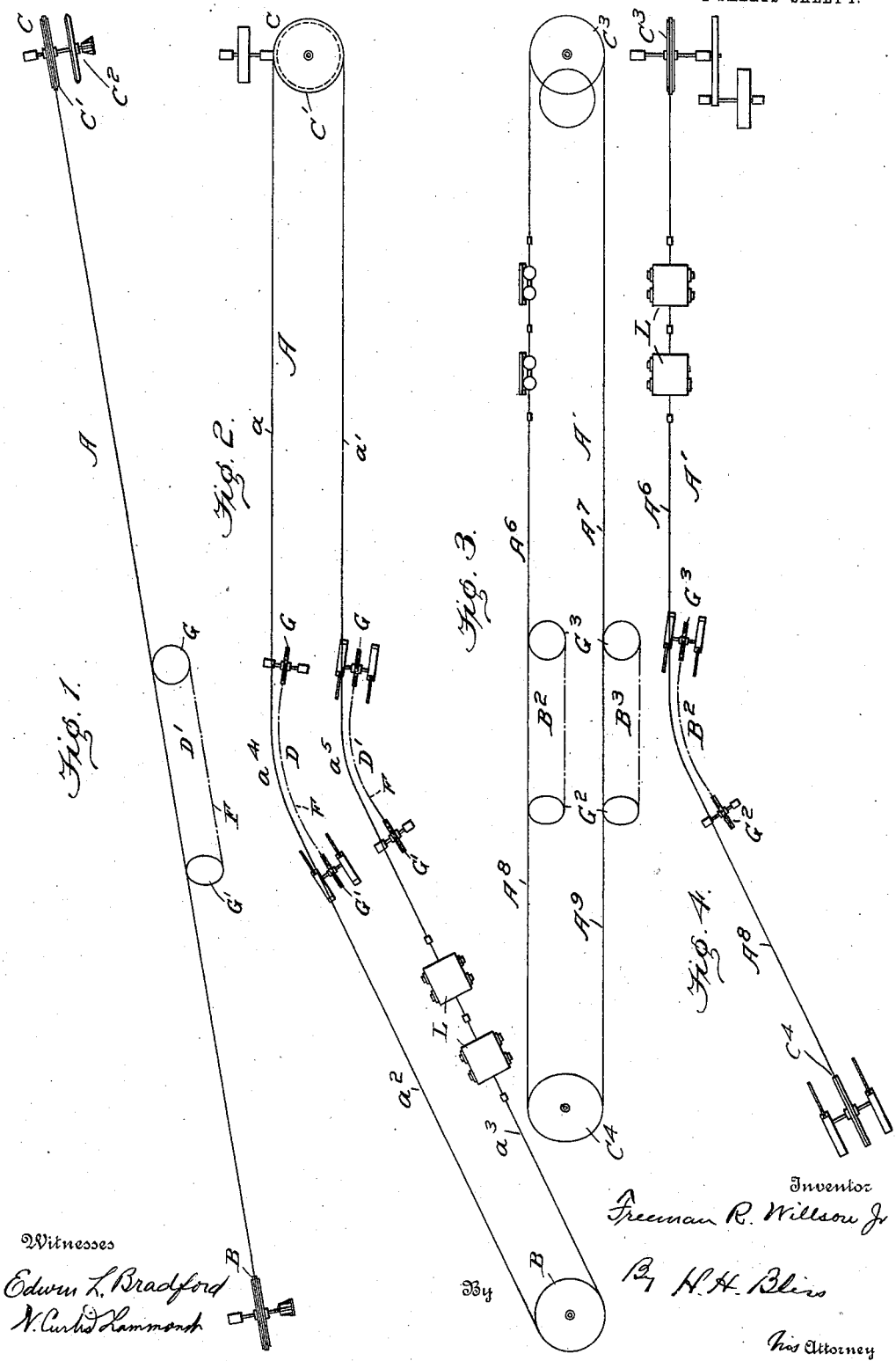

977,988.

Patented Dec. 6, 1910.
2 SHEETS—SHEET 2.

Witnesses
Edwin L. Bradford
N. Curtis Lammond

Inventor
Freeman R. Willson Jr.
By H. H. Bliss
his Attorney

UNITED STATES PATENT OFFICE.

FREEMAN R. WILLSON, JR., OF WORTHINGTON, OHIO, ASSIGNOR, BY MESNE ASSIGNMENTS, TO THE JEFFREY MANUFACTURING COMPANY, A CORPORATION OF OHIO.

CONVEYER.

977,988. Specification of Letters Patent. Patented Dec. 6, 1910.

Application filed October 4, 1906. Serial No. 337,424.

*To all whom it may concern:*

Be it known that I, FREEMAN R. WILLSON, Jr., a citizen of the United States, residing at Worthington, in the county of Franklin and State of Ohio, have invented certain new and useful Improvements in Conveyers, of which the following is a specification, reference being had therein to the accompanying drawing.

This invention relates to improvements in endless carriers and conveyers and power transmitters.

The object is to provide apparatus of this sort with supporting and guiding devices of such nature that the endless carrier can be caused to travel through paths having sections or parts inclined to each other and particularly when the angles of inclination are such that it is impossible to support and guide the conveyer element or power transmitting element upon a wheel of the ordinary character.

Figure 5:
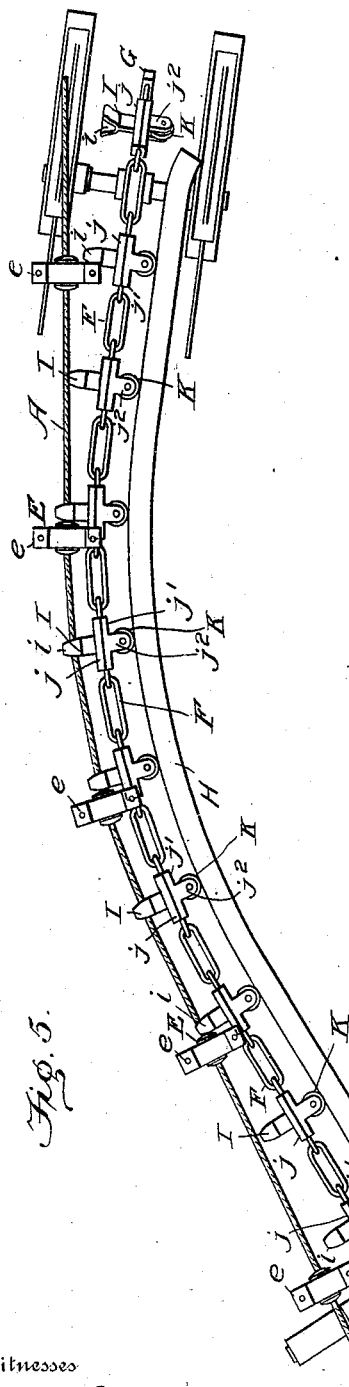
Figure 6:
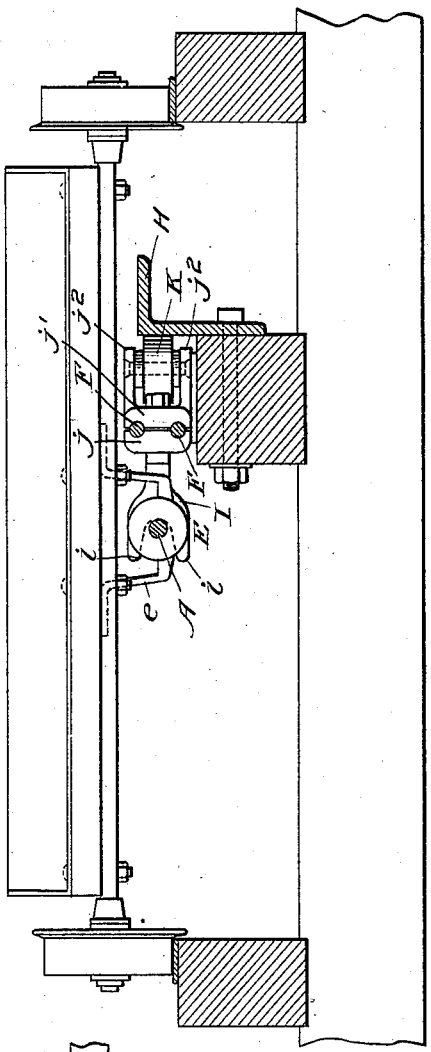
Figure 7:
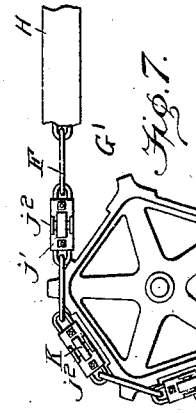

Figure 1 is a diagram indicating the positions and relations of the parts of a conveyer or power transmitting system embodying my improvements. Fig. 2 is a diagram illustrating in plan view the system presented in Fig. 1. Fig. 3 is a diagram indicating the positions and relations of the parts of a modified system. Fig. 4 is a diagram illustrating the positions and relations of the parts of the system in Fig. 3 when seen in top plan view. Fig. 5 is a plan view of that part of the system which is adjacent to a curve in the path of travel of the moving parts and showing said parts somewhat in detail. Fig. 6 is a cross section of the carrier and guide elements and showing also a car or truck adapted to be propelled by them. Fig. 7 shows one of the wheels and parts of the adjacent chain constituting a portion of one of the guiding elements.

In the drawings, referring first to Figs. 1 and 2, A indicates the endless, traveling structure, constituting the principal element in the apparatus, that is to say the element by which cars, carriers, receptacles or the like are transported, or by which such power can be transmitted. This element A is preferably constructed of an endless cable, and, in the construction shown, is provided with attachments E, to which are secured, or with which are formed, the means for imparting power to movable bodies, these means being lugs, bars or plates such as shown at $e$.

The endless part A engages with driving apparatus at C, having the cable wheel $C^1$ and means at $C^2$ for imparting power to the cable. Parts of the cable, considered as an entirety lie in straight lines as shown at $a$, $a^1$, $a^2$ and $a^3$. Between the parts $a$, $a^2$ there is a curve or bend $a^4$ and between those at $a^1$ and $a^3$ there is a curve $a^5$ in the path.

Heretofore carrier, conveyer, or power transmitting structures of this general class have been supported and guided at the points of curvature in their paths by means of rotary wheels engaging directly with the cable, chain, or flexible element. But it has been found that there are many places where a carrier or conveyer element of this kind can be advantageously used but where the curvatures in the paths are such that a guiding and supporting wheel cannot be used, unless it be one of a diameter so large as to be prohibitive. By examining the drawings it will be seen that the lines describing the curvature of the paths of the cable are struck on so large a radius that the inside angle, the angle between the line of that part of the path which is indicated by $a$ and the line of that part which is indicated by $a^2$ is very obtuse. When wheels are used for the purpose of supporting and guiding the angle between the parts of the path of the flexible element can seldom be greater than a right angle, and under any plan of construction with which I am acquainted can never be more than slightly greater than a right angle. The purpose of the present invention is to provide for the flexible element of the carrier or power transmitter a suitable guide and support of such character that it can be employed for a curvature of any required description.

In the diagrams in Figs. 1 and 2 the supporting and guiding devices are each indicated as an entirety by D, $D^1$. In this case the parts $a$ and $a^2$ of the flexible carrier lie in the same horizontal planes as the parts $a^1$, $a^3$; and consequently the guide elements D, $D^1$ are also placed in the same horizontal planes, one with the other. Each of these guide structures D, $D^1$, is composed of an endless chain F, sprocket wheels G, $G^1$ and stationary guides H, $H^1$. The chain F can be of any suitable character, but I at present prefer a chain of the cable style, that is, one with similar links interlooped, each lying in planes at right angles to those of the next.

The chain is provided with a series of sprocket like arms or projections I, adapted to engage with the main flexible element A, (cable or chain) or engage with the attachments, such as those at E, secured to it. As shown, each of these sprockets I, on the chain F, is forked as shown at $i, i$, the cavity between the forked arms being adapted to receive the cable or chain. When the attachments E, are spaced apart a considerable distance it is preferable to not only have some of the sprockets I on the guide element so arranged as to engage with these attachments successively but to have also intermediate sprockets I adapted to engage with parts of the cable or chain A intermediate of the sprockets E, as shown in Fig. 5. These sprocket parts can be formed separately from the chain and secured thereto in the way illustrated in the drawings. I form attachments for the chain each attachment having a plate $j$, with the sprocket formed thereon, and a plate $j^1$, having roller carrying arms $j^2, j^2$. K, K, indicate rollers respectively mounted in the carriers $j^2$, and secured therein by pintles. It will be seen that the endless guide element is so mounted and arranged that it travels in paths approximately parallel with the paths of the flexible carrier element A. The supporting wheels G and $G^1$ are mounted at an angle to each other and in planes approximately parallel with the path of travel of the part A. But in order to have the sprockets I, gradually approach and gradually recede from the part A, the planes of these wheels G, $G^1$ are not fully parallel but as nearly so as is practicable. The stationary guide elements H, $H^1$ are curved in the way illustrated, and against these the rollers K, K, bear as the chain travels along its path. The upper strand of the chain bears against the upper guide H and the lower or returning strand bears against the lower guide $H^1$.

By employing a chain of the character shown and above described, universal flexure is insured though this can be attained if the chain links be made in other well known ways. They can travel smoothly and accurately around the flat wheels G, $G^1$ and yet be permitted to move out from, and back, to the planes of these wheels as they move along the surface of the guides H, H.

By referring to the diagrams in Figs. 3 and 4 it will be seen that the upper and lower strands or legs of the flexible conveyer or power transmitter can be arranged so that one shall lie above the other, instead of lying in the same horizontal planes as shown in Figs. 1 and 2 above described. In this case the flexible carrier is indicated by $A^1$, the upper leg by $A^6, A^8$ and the lower leg by $A^7, A^9$. Here the guides $B^2, B^3$ are, respectively similar in construction to the guides $D^1, D^1$, but are arranged one above the other as shown in Fig. 3. The details of the carrier $A^1$ and the details of the guides $B^2$, $B^3$, respectively can be the same as those that have been above set forth, and repeated description is not necessary. In this instance the driving shaft will be vertical and the driving wheel, $C^3$, horizontal. The guide wheel or idler wheel $C^4$, is inclined somewhat to the horizontal. The sprocket wheels $G^2, G^3$ of the guide element are not on horital shafts as in the constructions in Figs. 1 and 2, but on shafts which are inclined to the vertical.

As above stated, the essential features which characterize the improvement can be employed for either of several purposes. I have found them very advantageous for the transporting of trucks or cars from place to place. One of these is indicated at L.

What I claim is:—

1. The combination with an endless carrier or power transmitter having parts arranged to travel in a curvilinear path, of an endless guiding device at the curve in the said path and adapted to engage with and to be disengaged from the carrier or power-transmitter, and having the part which moves in one direction approximately in the plane common to all parts of the curved part of the path of the endless carrier or power transmitter and the part which moves in the opposite direction arranged to travel in planes remote from the last aforesaid planes, substantially as set forth.

2. The combination with an endless carrier or power transmitter having parts arranged to travel in a curvilinear path, of an endless guiding device at the curve in the said path and adapted to engage with and to be disengaged from the carrier or power transmitter, and supporting wheels for the endless guide arranged in planes at right angles or inclined to the plane of the path of the adjacent part of the endless carrier or power-transmitter, the active part of the endless guide traveling in a path approximately parallel to the path of the endless carrier or power transmitter, substantially as set forth.

3. The combination with an endless carrier or power transmitter having parts arranged to travel in a curvilinear path, of an endless guiding device at the curve in the said path and adapted to engage with and to be disengaged from the carrier or power transmitter, and having a path of travel which is approximately parallel to the path of the adjacent part of the endless carrier or power transmitter, and parts of which are in planes at right angles or inclined to the plane of the adjacent part of the endless carrier or power transmitter, substantially as set forth.

4. The combination with an endless carrier or power transmitter having parts arranged to travel in a curvilinear path, of an endless guiding device at the curve in the said path adapted to engage with and to be disengaged from the carrier or power transmitter, and having the part which moves in one direction approximately in the plane common to all parts of the curved part of the path of the adjacent part of the carrier or endless power transmitter, and arranged to travel approximately parallel to the carrier or transmitter, and the part which moves in the opposite direction arranged to travel in a path approximately parallel to the first aforesaid part of the endless guiding device, and in a plane remote from the aforesaid plane of the adjacent part of the carrier or endless power transmitter, substantially as set forth.

5. The combination with an endless carrier or power transmitter traveling in a curvilinear path and having laterally projecting attachments, formed with surfaces lying in planes at an angle to the path of said endless carrier, of an endless guide adjacent to the curved part of said path and having arms or projections adapted to engage with the said surfaces of said attachments, substantially as set forth.

6. The combination with an endless carrier or power transmitter traveling in a curvilinear path, of an endless guide adjacent to the curved part of said path, and having forked arms adapted to receive between its fingers the said endless carrier, the plane common to the two fingers of each of the arms being perpendicular to the plane common to all parts of the curved part of the path of the carrier substantially as set forth.

In testimony whereof I affix my signature, in presence of two witnesses.

FREEMAN R. WILLSON, Jr.

Witnesses:
CHAS. L. MILLER,
P. C. DIERDORFF.